United States Patent [19]

Ball

[11] 4,241,243
[45] Dec. 23, 1980

[54] POWER REGULATOR FOR USE WITH LINE SIGNAL REPEATERS WHICH ARE REMOTELY POWERED

[75] Inventor: Edward T. Ball, Coquitlam, Canada

[73] Assignee: GTE Lenkurt Electric (Canada) Ltd., Burnaby, Canada

[21] Appl. No.: 965,974

[22] Filed: Dec. 4, 1978

[51] Int. Cl.³ .................... H02H 9/02; H02H 1/04; H04B 3/44

[52] U.S. Cl. .................... 179/170 J; 323/8; 361/119

[58] Field of Search .................. 361/56, 60, 117, 119, 361/126, 91, 110, 111; 179/170 R, 170 J, 170 T, 184; 330/207 P; 323/8, 23, 25

[56] References Cited

U.S. PATENT DOCUMENTS

| | | | |
|---|---|---|---|
| 3,986,078 | 10/1976 | Tollrian et al. | 361/56 |
| 4,049,929 | 9/1977 | Ball | 179/170 J |
| 4,099,217 | 7/1978 | Fitchew | 361/111 |
| 4,110,570 | 8/1978 | Foster | 179/170 J |

Primary Examiner—Bernard Konick
Assistant Examiner—Randall P. Myers
Attorney, Agent, or Firm—Leonard R. Cool

[57] ABSTRACT

Operating power for line signal repeaters is fed over a transmission cable pair (signal line) which is susceptible to lightning strikes and, thus, to longitudinally induced currents in the DC power feed circuit. A symmetrical non-linear power regulator is connected between the signal line and the line signal repeater, and includes a high current shunt regulator which bypasses excessive induced currents. By so doing the adverse effects of these induced currents on the operation of the line signal repeater is minimized. A shunt voltage regulator provides the line repeater with a constant operating voltage when the line current (DC line power feed current plus induced currents) is greater than the minimum required bias current. When the potential at input terminals of the power regulator exceeds a predetermined value, a portion of the excess current is conducted through a blocking diode to charge an energy storage device. But, when the DC line power feed current and the induced current oppose each other the energy stored in the energy storage device is used to supplement the power feed current to just maintain the required repeater voltage, until the potential decreases below the operating voltage.

5 Claims, 2 Drawing Figures

POWER REGULATOR FOR USE WITH LINE SIGNAL REPEATERS WHICH ARE REMOTELY POWERED

BACKGROUND OF THE INVENTION

This invention pertains generally to the field of telecommunications and more particularly to repeatered carrier systems, such as pulse code modulation (PCM) systems using a transmission cable pair as the transmission medium. The repeaters for such systems are usually powered via the transmission cable pair from a central office where the terminal equipment is located. A simplex power loop is a most attractive method for providing DC power feed current to signal line repeater. For a discussion and an illustration of a simplex power loop refer to "Bipolar Repeater for PCM Signals" by J. S. Mayo, *Bell System Technical Journal*, Jan. 1962, pages 73–76.

A transmission cable pair (hereinafter referred to as a signal line) with exposure to lightning strikes is susceptible to induced longitudinal currents. These induced currents potentially can cause transmission impairment with the communication signals and interference with the DC power feed current supplied to the signal repeaters installed along the signal line. The effect of the induced currents upon the simplex power loop is to cause the DC power feed current in the simplex power loop to be amplitude modulated. The induced current causes the instantaneous line current, i.e., DC power feed current plus the induced current, to vary above or below some nominal level. When the instantaneous line current is above the minimum level necessary to power the repeater, the excess power is usually converted into heat primarily in the signal line by the action of the voltage control circuitry within the repeaters. However, when the instantaneous line current is below the minimum level necessary for operation of the repeater, the repeater is starved for power and fails to perform properly. Thus, it is important to control the effect of lightning induced currents on the DC power feed to the repeater.

The reduction of interference to the DC line current from lightning strikes has been regarded as unusually difficult or even impossible to treat effectively. It is common to use breakdown devices which are normally non-conductive and which suddenly are rendered fully conductive when the voltage reaches a prescribed value. However, such techniques do not necessarily provide for adequate control of the DC power feed current to the repeater during the breakdown period.

SUMMARY OF THE INVENTION

Accordingly the present invention provides a power regulator for improving the resistance to a lightning strike of a signal repeater (i.e., the susceptibility of the repeater to induced currents caused by lightning strikes). The signal line, providing power to the repeater connects to the power regulator at first and second input terminals thereof. Third and fourth output terminals of the circuit are connected to the signal repeater, with the fourth terminal being common with the second terminal. An impedance device connected between the first and third terminals offers an impedance to any induced signal applied thereto. A shunt regulating element establishes a reference voltage. A shunt voltage regulating unit establishes the voltage across the output terminals at a substantially constant level, so long as the current flowing through the regulating unit exceeds a predetermined minimum level. A biasing means provides first and second bias voltages each of which is indicative of any change in voltage across the voltage regulating means. An energy storage device is connected across the fourth terminal and a fifth terminal. A rectifier, connected across the first and fifth terminals, permits current to flow into the energy storage device and be stored therein when the potential across the input terminal exceeds, by a predetermined amount, the potential across the fourth and fifth terminals. And, when the potential across the input terminals is less than the voltage across the fourth and fifth terminals the rectifier blocks the flow of current out of the energy storage device to the signal line and, thus, the current flows to the repeater. A control means responsive to the reference voltage and the first bias voltage controls the rate at which current flows out of said energy storage device to said third terminal, thereby enabling the voltage across said third and fourth terminals to remain substantially constant despite induced currents applied to said first terminal via the signal line. Thus the current in the energy storage device supplements the input line current during brief periods when the sum of the DC input current and the induced current are insufficient to power the signal repeater. And a shunt voltage regulating means is responsive to the reference voltage and the second bias voltage to regulate the amplitude of the voltage supplied to the output terminals.

DETAILED DESCRIPTION OF THE INVENTION

Figure 1:
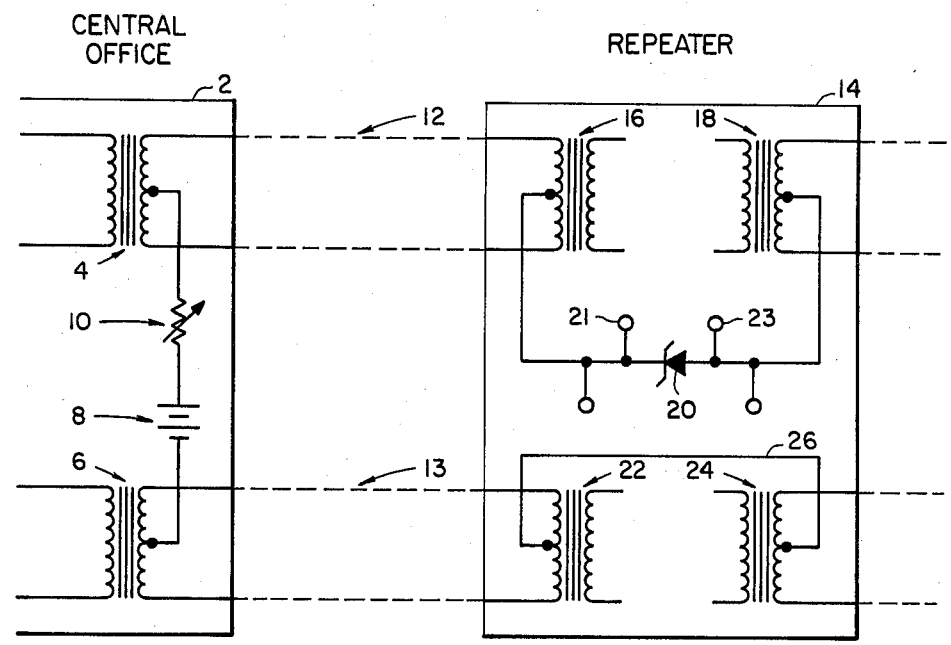
FIG. 1 is a schematic diagram illustrating one prior art technique for providing DC power feed current to repeaters by means of a simplex power loop.

Referring to FIG. 1, it may be seen that DC power feed current is supplied from a central office 2 via signal line (transmission cable pair) 12 to repeater 14. The repeater voltage supply developed at terminals 21 and 23 is symbolically shown to be obtained from zener diode 20, or a result of the DC power feed current fed through the simplex power loop. It is apparent that at a more distant repeater a power connection would be made between signal line 12 and signal line 13 to provide the necessary return path to the power supply 8 at central office 2. It also is apparent that one signal line could be used, such as 12 in FIG. 1, and the return path could be an earth ground. In any case, the signal line may be and often is exposed to the elements so that longitudinally induced currents are caused by lightning. Such induced currents are of fairly large magnitude and if not properly treated adversely affect the operation of the signal line repeater in the transmission path. A power regulator such as is shown in FIG. 2 replaces zener diode 20 and is connected between the voltage supply terminals 21 and 23 and the repeater power input circuit to minimize the effect of these induced currents.

Figure 2:
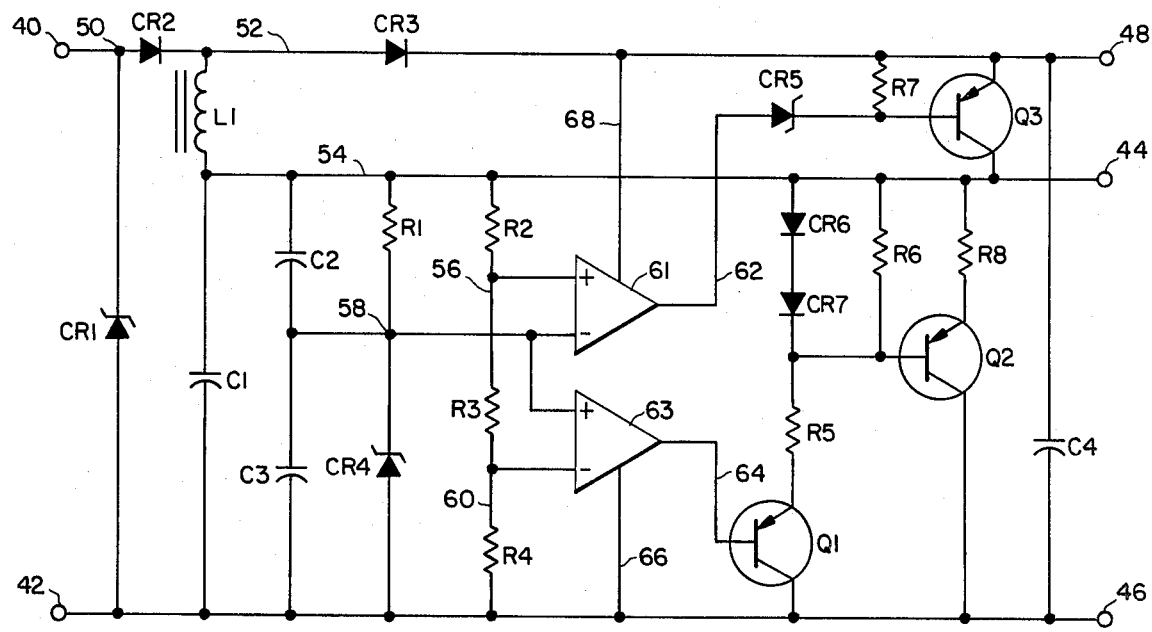
FIG. 2 is a schematic diagram of one embodiment of this invention.

Broadly, the particular embodiment shown in FIG. 2 interconnects between a signal line repeater and the signal line. With reference to FIG. 2, there is shown a pair of input terminals 40 and 42, and a pair of output terminals 44 and 46. Input terminals 40 and 42 connect to the signal line terminals 21 and 23 to receive an input current, i.e., the line current which energizes the signal repeater. Input terminals 40 and 42 connect to the signal line such that the polarity of terminal 40 is positive with respect to terminal 42. Output terminals 44 and 46 connect to the power input connections of the signal repeater (not shown) with terminal 44 being positive with respect to terminal 46. As shown in FIG. 2, terminals 42 and 46 are common with each other.

Diode CR1 connected across terminals 40 and 42 protects against large currents, and diode CR2 connected between lead 50 and lead 52 in combination with diode CR1 protect against reverse current.

Inductor L1, which offers an AC impedance to the line is connected across lead 52 and an output lead 54 which eventually connects to terminal 44. Inductor L1 in one embodiment, was designed to have an impedance of approximately 500 ohms at 1 kHz being the most probable frequency of interference. Refer to U.S. FDA, R.E.A. PE60 (U.S. Federal Department of Agriculture Rural Electrification Agency Specification) for description of a typical lightning strike induced signal. The particular value of inductor L1 depends upon several factors such as the frequency and magnitude of the interference expected. In operation CR2 and L1 conducts the DC input current to a shunt voltage regulating means which includes zener diode CR4 which serves as a reference source for shunt current regulator comparator 63. Resistor R1 provides necessary current to assure proper zener operation of CR4. Resistors R2, R3, and R4 provide the first and second bias voltage inputs to comparators 61 and 63. Capacitors C1, C2, and C3 provide a low impedance for by-passing spurious currents which may affect the reference voltage developed by CR4.

Shunt current regulator comparator 63 is connected to the current limited compound shunt regulator consisting of Q1, R5, CR6, CR7, R6, R8 and Q2. L1 is the input stage of the shunt current regulator. R5 limits the current through Q1 and CR6 and CR7 to approximately 200 milliamperes. R6 assures that Q2 will turn off when no current flows through Q1. Diodes CR6 and CR7 limit the voltage between output terminal 44 and the base of Q2 to approximately 1.8 V. This will limit the voltage across R8 to approximately 0.9 V and thereby limit the current through R8 and Q2 to 9.0 amperes, thereby preventing self destruction of R8 and Q2. The total shunt current regulator capability is thereby approximately 9.2 amperes. (Sum of Q1 current and Q2 current). For the implementation chosen CR4 has a zener voltage of 4.5 V and results in a voltage of approximately 10 V across output terminals 44 and 46.

The shunt current regulator will therefore maintain the voltage across terminals 44 and 46 at approximately 10 V when the input current varies from the minimum bias current of approximately 100 mA to a current of 9.2 amperes.

Comparator 61, CR5, Q3, CR3 and C4 form an energy storage and control means. Diode CR3 conducts current when the voltage at the junction of CR2, L1 and CR3 exceeds the voltage across C4 by 0.6 V (assumes CR3 is silicon device) and will charge C4 to a voltage of 0.6 V less than at the junction of CR2, CR3 and L1. The voltage at output terminal 44 is approximately 1.0 V less than that at the junction of CR2, CR3 and L1 due to the DC resistance of L1 ($\approx 10\omega$) and the minimum bias current required for the repeater and control circuitry of 100 mA. This results in the voltage at terminal 48 being approximately 0.4 V higher than the normal voltage at output terminal 44.

When the input current into terminals 40 and 42 is less than 100 mA (the minimum required for a repeater unit connected to terminals 44 and 46) the voltage across R2, R3, R4 will decrease causing comparator 61 to turn on Q3 via CR5. Transistor Q3 is turned on and passes sufficient current from energy storage capacitor C4 to output terminal 44 to just maintain the required output voltage. This action will continue until the energy stored in C4 is partially depleted and voltage across terminals 44 and 46 drops. The energy stored in C4 is sufficient to accommodate the lightning induced currents, per U.S. FDA, R.E.A. PE60. Resistor R7 assures Q3 will turn off, when no current is required from C4.

Diode CR1 serves to protect the circuitry from potential damage from very large currents (i.e., greater than 9.2 amperes) and CR1 and CR2 protect circuitry from reverse currents.

Functionally the circuit shown in FIG. 2 operates as follows:

Assuming first that there is no lightning induced current component on the signal line, the input current enters at terminal 40, and is conducted through diode CR2 and inductor L1. A small portion of this current goes to bias the voltage reference source CR4 via resistor R1, an additional small portion is conducted through the comparator input bias network R2, R3 and R4, and the remainder is connected through to the output terminals and the repeater load.

When a lightning strike induced current has a polarity such that it aids the normal DC power feed current the voltage at lead 50 rises, lead 52 rises, as does lead 54. A portion of this rise appears at lead 60. When the magnitude of this rise causes the voltage on lead 60 to exceed the voltage on lead 58 the (reference voltage) lead 64 goes toward the voltage on lead 66 (if lead 60 is negative with respect to lead 58 then lead 64 is at the voltage of lead 68). Lead 64 voltage going towards the voltage on lead 66 causes Q1 to conduct when lead 64 is 0.6 V less positive than lead 54. When the voltage drop across R6 exceeds 0.6 V Q2 conducts increasing the current through leads 50, 52, and 54, thereby reducing the voltage on lead 54.

When a lightning strike induced current has a polarity such that it opposes the normal line feed current the voltage at leads 50, 52, 54 reduces. The voltage at lead 56 is proportionally reduced and when lead 56 becomes more negative than lead 58, lead 62 (normally the same potential as lead 68) goes toward the voltage on lead 66. Lead 62 will reach a voltage that causes CR5 and hence Q3 to conduct. Conduction by Q3 will cause the charge stored in C4 to be fed to lead 54, thereby stabilizing the voltage on lead 54 which connects to terminal 44.

What is claimed is:

1. In a transmission system in which operating power is fed over the transmission cable pair to line signal repeaters, a power regulator used in conjunction with a line signal repeater, which comprises:
   an input circuit including first and second terminals connected to receive line current including a DC power feed current component and an induced longitudinal current component;
   an output circuit including third and fourth terminals, said output circuit when coupled to said repeater supplying load current thereto, said fourth terminal being common with said second terminal;

impedance means, having an input terminal connected to said first terminal and an output terminal connected to said third terminal, for receiving said line current from said first terminal and for delivering said load current to said third terminal;

a fifth terminal;

energy storage means connected across said fourth and fifth terminals;

rectifying means connected across said first and fifth terminals, said rectifying means being conductive when the line current exceeds the load requirements of the line signal repeater and being non-conductive otherwise, said rectifying means thereby providing excess line current to charge said energy storage device;

shunt voltage regulating means connected between said fourth terminal and said third terminal, said shunt voltage regulating means being responsive to said line current for producing a constant voltage across said third and fourth terminals so long as said line current exceeds a predetermined minimum, and causing said constant voltage to decrease when said line current falls below said minimum, said shunt voltage regulating means also providing a reference voltage at a reference voltage terminal;

biasing means connected between said third and fourth terminals for providing first and second voltages at first and second bias voltage terminals, respectively, said bias voltages varying in response to variations in amplitude of the line current;

control means responsive to said reference voltage and said first bias voltage, for controlling the period of and rate of energy discharge from said energy storage means to said output circuit, whereby the energy in said energy storage means supplements a power feed current when the line current falls below said predetermined minimum; and shunt current regulating means responsive to said reference voltage and to said second bias voltage, for controlling the amplitude of the current passed through said output terminals.

2. A power regulator in accordance with claim 1 wherein said shunt current regulating means further comprises:

a comparator (63) having an output terminal and first and second input terminals connected, respectively, to said second bias voltage terminal and to said reference voltage terminal, said comparator providing a control signal at its output terminal when the longitudinally induced current exceeds a predetermined value and is of a polarity to increase the line current; and bypass means having a first input terminal connected to the output of said comparator, having a second input terminal connected to said third terminal and having a first output terminal connected to said second terminal of said input circuit.

3. A power regulator in accordance with claim 2 wherein said bypass means further comprises:

a first transistor (Q1) having emitter, collector and base terminals, said base terminal being connected to said bypass means first input terminal and said collector being connected to said bypass means first output terminal;

a current limiting resistor (R5) having one terminal end thereof connected to said emitter terminal of the first transistor;

first (CR6) and second (CR7) diodes serially connected anode to cathode and having the cathode of said first diode connected to said cathode and having the cathode of said first diode connected to said bypass means second input terminal and the anode of said second diode connected to the other terminal of said current limiting resistor;

a second transistor (Q2) having base, emitter and collector terminals, said base terminal being connected to the other terminal of said current limiting resistor resistor, and said collector terminal being connected to said bypass means first output terminal;

a second resistor having one end connected to said bypass means second input terminal and having the other end thereof connected to the base of said second transistor, said second resistor biasing said second transistor off when said first transistor is not conducting; and a third resistor having one end connected to said bypass means second input terminal and the other end thereof connected to the emitter of said second transistor.

4. A power regulator accordance with claim 2 or 3 wherein said shunt voltage regulating means further comprises:

a zener diode (CR4) having its anode connected to said second terminal and providing said reference voltage at its cathode;

a bias current resistor (R1) having one end connected to the output terminal of said impedance means and having the other end connected to the cathode of said zener diode.

5. A power regulator in accordance with claim 4 wherein said control means further comprises:

a second comparator (61) having a first input terminal connected to said reference voltage terminal, a second terminal input operatively connected to said first bias voltage terminal and having an output terminal, said second comparator providing at said output terminal a control signal when the input current into said first and second terminals is less than a predetermined minimum;

a second zener diode (CR5) having the anode connected to the output terminal of said second comparator;

a control transistor (Q3) having base emitter and collector terminals, the base being connected to the cathode of said second zener diode, the collector being connected to said third terminal (44) and the emitter being connected to the fifth terminal (48), said control signal from said second comparator turning on said control transistor (Q3) so as to supply current to said third terminal (44) from said energy storage means (C4) when the input current at said first and second terminals (40 and 42) is below said predetermined minimum; and a clamping resistor (R7) having one end connected to the base of said control transistor and the other end thereof connected to said emitter to insure that said control transistor will turn off when there is no control signal from said second comparator.

* * * * *